United States Patent
You et al.

(10) Patent No.: US 10,356,380 B2
(45) Date of Patent: Jul. 16, 2019

(54) APPARATUS AND METHOD FOR ACQUIRING DEPTH INFORMATION

(71) Applicant: SAMSUNG ELECTRONICS CO., LTD., Suwon-si (KR)

(72) Inventors: Jangwoo You, Seoul (KR); Yonghwa Park, Yongin-si (KR); Heesun Yoon, Seoul (KR); Myungjae Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 15/140,716

(22) Filed: Apr. 28, 2016

(65) Prior Publication Data

US 2017/0127036 A1 May 4, 2017

(30) Foreign Application Priority Data

Oct. 29, 2015 (KR) ........................ 10-2015-0151102

(51) Int. Cl.
*H04N 13/00* (2018.01)
*H04N 5/225* (2006.01)
(Continued)

(52) U.S. Cl.
CPC ......... *H04N 13/106* (2018.05); *G01S 7/4816* (2013.01); *G01S 7/4914* (2013.01); *G01S 7/4915* (2013.01); *G01S 17/36* (2013.01); *G01S 17/89* (2013.01); *H04N 5/2256* (2013.01); *H04N 5/353* (2013.01); *H04N 13/254* (2018.05); *H04N 13/296* (2018.05); *H04N 5/33* (2013.01); *H04N 5/3532* (2013.01)

(58) Field of Classification Search
CPC ........ G01S 17/36; G01S 17/89; G01S 7/4816; G01S 7/4914; G01S 7/4915; H04N 13/0007; H04N 13/0253; H04N 13/0296; H04N 5/2256; H04N 5/33; H04N 5/353; H04N 5/3532
See application file for complete search history.

(56) References Cited

U.S. PATENT DOCUMENTS

2008/0231832 A1 9/2008 Sawachi
2013/0101176 A1* 4/2013 Park ...................... G01S 17/36
                                                    382/106
(Continued)

FOREIGN PATENT DOCUMENTS

JP  2007-178314 A   7/2007
JP  4831760 B2     12/2011
(Continued)

*Primary Examiner* — Md N Haque
(74) *Attorney, Agent, or Firm* — Sughrue Mion, PLLC

(57) ABSTRACT

An apparatus and a method for acquiring depth information are disclosed. To acquire depth information, illumination light of which an amount of light has been modulated by a modulation signal is emitted towards a subject, and an image is captured using an image sensor. An image signal is sequentially acquired from a plurality of rows while shifting a phase of the illumination light at a start exposure time of a row belonging to an intermediate region of a pixel array region of the image sensor. Depth information is calculated from image signals acquired during a plurality of frames while shifting a phase of the modulation signal.

14 Claims, 8 Drawing Sheets

(51) Int. Cl.
*H04N 13/106* (2018.01)
*H04N 13/296* (2018.01)
*H04N 5/353* (2011.01)
*G01S 17/36* (2006.01)
*G01S 17/89* (2006.01)
*G01S 7/481* (2006.01)
*G01S 7/491* (2006.01)
*H04N 13/254* (2018.01)
*H04N 5/33* (2006.01)

(56) References Cited

U.S. PATENT DOCUMENTS

| | | | |
|---|---|---|---|
| 2013/0123015 A1* | 5/2013 | Jung | G06K 9/78 |
| | | | 463/37 |
| 2013/0175429 A1* | 7/2013 | Rao | G01S 17/89 |
| | | | 250/208.1 |
| 2013/0201183 A1 | 8/2013 | Park et al. | |
| 2015/0002734 A1* | 1/2015 | Lee | H04N 5/2256 |
| | | | 348/367 |

FOREIGN PATENT DOCUMENTS

| | | |
|---|---|---|
| JP | 5295511 B2 | 9/2013 |
| KR | 10-2013-0045018 A | 5/2013 |

\* cited by examiner

APPARATUS AND METHOD FOR ACQUIRING DEPTH INFORMATION

CROSS-REFERENCE TO RELATED APPLICATIONS

This application claims priority to Korean Patent Application No. 10-2015-0151102, filed on Oct. 29, 2015, in the Korean Intellectual Property Office, the disclosure of which is incorporated herein in its entirety by reference.

BACKGROUND

1. Field

The present disclosure relates to apparatuses and methods for acquiring depth information, and more particularly, to apparatuses and methods for acquiring depth information by applying a rolling shutter scheme.

2. Description of the Related Art

Recently, along with popularity of cameras and demands of users, a technique of capturing not only a two-dimensional (2D) but also a three-dimensional (3D) stereoscopic image using information about a distance to an object has received attention. An element for sensing a distance by acquiring distance information of an object is referred to as a depth sensor, and a device for acquiring a 3D stereoscopic image with the depth sensor is referred to as a 3D image sensor.

A depth sensor measures a distance to an object by measuring a delay time of light returning after the light is projected from a light source and is reflected from the object. A pixel of the depth sensor includes a photoelectric conversion element. The photoelectric conversion element generates photocharges depending on an amount of light returning after the light is emitted from a light source and is reflected from an object. A difference between a projection time point of light and a detection time point thereof is referred to as time of flight (TOF). A distance to an object may be calculated using TOF, and a 3D image may be realized based on the calculated distance with color information acquired using another sensor.

SUMMARY

Provided are a depth information acquisition apparatus and method capable of increasing the performance of depth precision when depth information is extracted.

Additional aspects will be set forth in part in the description which follows and, in part, will be apparent from the description, or may be learned by practice of the presented exemplary embodiments.

According to an aspect of an exemplary embodiment, a depth information acquisition method includes: emitting illumination light, of which an amount has been modulated by a modulation signal, towards a subject; receiving, by an image sensor, reflective light reflected from the subject, the image sensor having a pixel array region including a plurality of rows, the plurality of rows including a first region including a first row of the plurality of rows, a second region including a last row of the plurality of rows, and an intermediate region located between the first region and the second region, for a plurality of frames, sequentially acquiring an image signal from each of the plurality of rows by staggering a start exposure time for each of the plurality of rows, and shifting a phase of the illumination light at a start exposure time of a row belonging to the intermediate region of the pixel array region; and calculating depth information of the subject from the acquired image signals acquired during the plurality of frames.

The intermediate region of the pixel array region may include a center row of the pixel array region.

The phase of the illumination light may be shifted at a start exposure time of the center row of the pixel array region.

The phase of the illumination light may be shifted by 90°, such that each row of the pixel array region is exposed during a first period r before the phase shift of the illumination light and a second period (1−r) after the phase shift of the illumination light, and an amplitude of an image signal acquired from each row of the pixel array region of the image sensor may be proportional to $\sqrt{r^2+(1-r^2)}$.

The illumination light may be burst-driven and emitted in predetermined time units, and the phase of the illumination light may be shifted and emission of the illumination light starts may be started after a start exposure time of a center row of the pixel array region.

An image signal corresponding to only a single phase of the illumination light may be acquired.

The shifting the phase of the illumination light may include shifting the phase of the illumination light by 90°, and the depth information may be calculated from image signals acquired from four frames while shifting the phase by 90°.

According to another aspect of an exemplary embodiment, a depth information acquisition apparatus includes: a light source configured to emit illumination light, of which an amount has been modulated by a modulation signal, towards a subject; an image sensor configured to receive reflective light reflected from the subject, the image sensor having a pixel array region including a plurality of rows, the plurality of rows including a first region including a first row of the plurality of rows, a second region including a last row of the plurality of rows, and an intermediate region located between the first region and the second region; and a depth image processor configured to, for a plurality of frames, sequentially acquire an image signal from each of the plurality of rows by staggering a start exposure time for each of the plurality of rows, and to calculate a distance to the subject by using the acquired image signals, and a controller configured to shift a phase of the illumination light at a start exposure time of a row belonging to the intermediate region of the pixel array region.

The image sensor may be configured to operate in a rolling shutter scheme.

The depth information acquisition apparatus may further include a light source driver configured to drive the light source by using the modulation signal and shift the phase of the modulation signal by synchronizing with a frame rate of the image sensor.

The image sensor may be any one of a charge-coupled device (CCD) image sensor, a complementary metallic oxide semiconductor (CMOS) image sensor, and a photodiode array.

According to another aspect of an exemplary embodiment, a three-dimensional (3D) image acquisition apparatus includes the depth information acquisition apparatus and an image acquisition apparatus for sensing image information.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
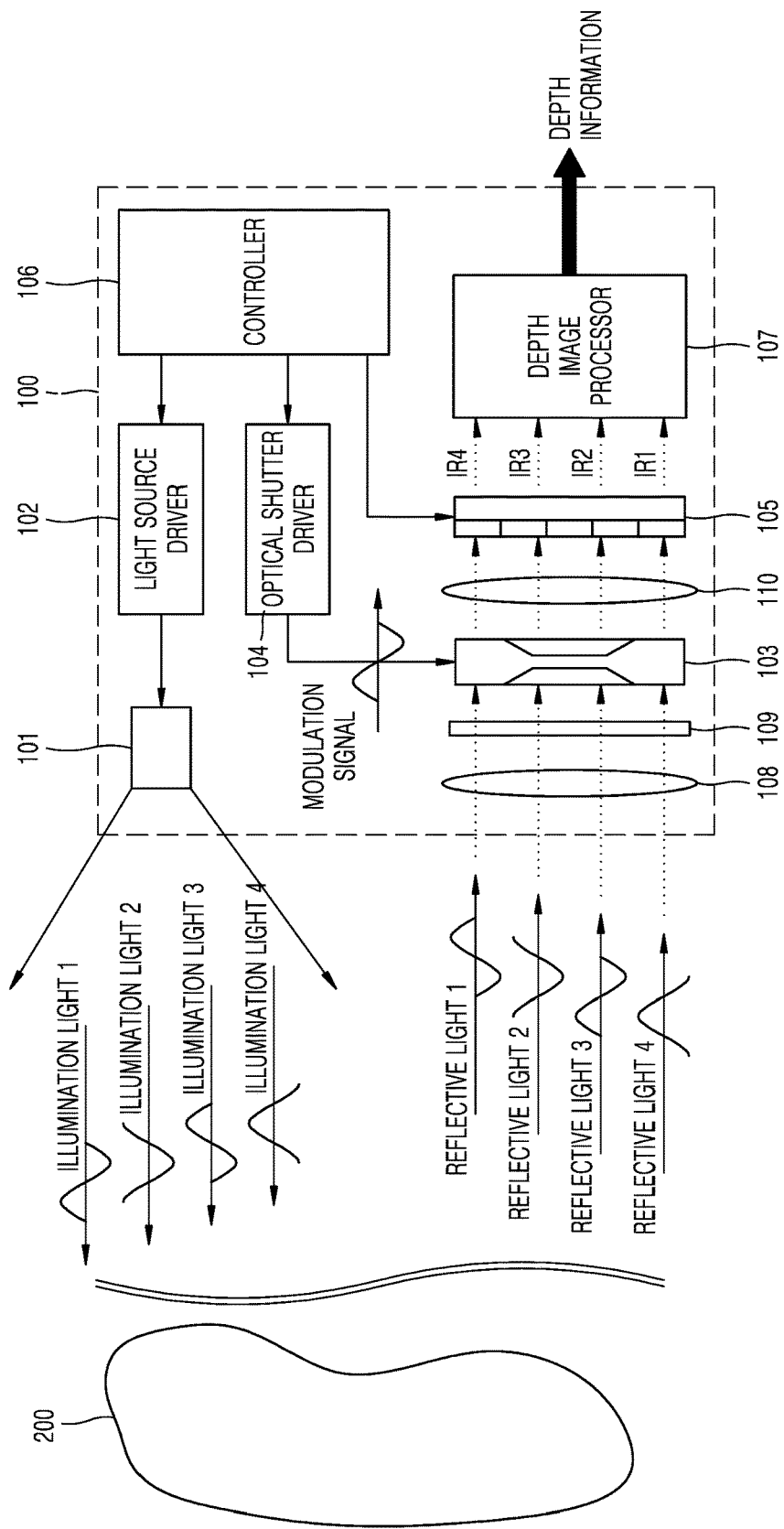
FIG. 1 illustrates a block diagram of a depth information acquisition apparatus according to an exemplary embodiment.

An apparatus and method for acquiring depth information, according to exemplary embodiments, will now be described in detail with reference to the accompanying drawings. In the drawings, like reference numerals refer to like elements, and the sizes of components may be exaggerated for clarity and convenience of description. In this regard, the present exemplary embodiments may have different forms and should not be construed as being limited to the descriptions set forth herein. Accordingly, the exemplary embodiments are merely described below, by referring to the figures.

FIG. 1 illustrates a block diagram of a depth information acquisition apparatus 100 according to an exemplary embodiment. The depth information acquisition apparatus 100 of FIG. 1 may be applied to a three-dimensional (3D) image acquisition apparatus to realize a 3D image by combining image information and depth information of a subject.

Referring to FIG. 1, the depth information acquisition apparatus 100 according to the present exemplary embodiment may include a light source 101 configured to emit illumination light having a certain wavelength, a light source driver 102 configured to drive the light source 101, an optical shutter 103 configured to modulate light reflected from a subject 200, an optical shutter driver 104 configured to drive to the optical shutter 103, an image sensor 105 configured to acquire an image signal by detecting light which has passed through the optical shutter 103, a depth image processor 107 configured to calculate depth information based on the image signal output from the image sensor 105, and a controller 106 configured to control operations of the light source driver 102, the optical shutter driver 104, the image sensor 105, and the depth image processor 107. In addition, a first lens 108 configured to concentrate reflective light within a region of the optical shutter 103 and a filter 109 configured to transmit only light having the certain wavelength may be further disposed on a light-incident side of the optical shutter 103. A second lens 110 configured to concentrate an image within a region of the image sensor 105 may be further disposed between the optical shutter 103 and the image sensor 105.

The light source 101 may be, for example, a light-emitting diode (LED), an organic light-emitting diode (OLED), or a laser diode (LD) capable of emitting infrared (IR) light invisible to the eyes of a human being, e.g., light having a near-infrared (NIR) wavelength of about 850 nm, for safety. However, an emission wavelength band and a light source type of the light source 101 are not limited thereto. The light source driver 102 drives the light source 101 by using a modulation signal according to a control signal received from the controller 106 so as to modulate an amount of illumination light output from the light source 101 and output the modulated illumination light and shifts a phase of the illumination light by shifting a phase of the modulation signal. According to the modulation signal provided from the light source driver 102, the illumination light projected from the light source 101 to the subject 200 may have a form of a continuous function having a certain period. For example, the illumination light may have a sinusoidal waveform. Alternatively, the illumination light may have a particularly defined waveform such as a triangular waveform, a rectangular waveform, or a square waveform or a combination thereof, i.e., an undefined general waveform.

The illumination light output from the light source 101 may be projected to the subject 200. To obtain depth information of the subject 200, the depth information acquisition apparatus 100 according to the present exemplary embodiment may emit the illumination light towards the subject 200 while shifting a phase of the illumination light, for example, by 90°, and sense reflective light from the subject 200 through the image sensor 105.

The light source driver 102 may drive the light source 101 by using the modulation signal such that the illumination light of which an amount of light has been modulated is output from the light source 101. The light source driver 102 may shift the phase of the modulation signal by synchronizing with a frame rate of the image sensor 105, e.g., around 10-120 Hz. Accordingly, the light source 101 outputs the illumination light of which an amount of light has been modulated and a phase has been shifted by synchronizing with the frame rate of the image sensor 105, e.g., around 10-120 Hz.

The optical shutter 103 operates under control of the optical shutter driver 104. The optical shutter driver 104 drives the optical shutter 103 according to a control signal received from the controller 106. For example, the optical shutter 103 may operate according to a modulation signal provided from the optical shutter driver 104. The modulation signal for the light source 101 and the modulation signal for the optical shutter 103 may have a same period. For example, the optical shutter 103 may operate by synchronizing with the frame rate of the image sensor 105, e.g., around 10-120 Hz.

As described above, an operating frequency of the optical shutter 103 may be the same as an operating frequency of the light source 101.

Figure 2:
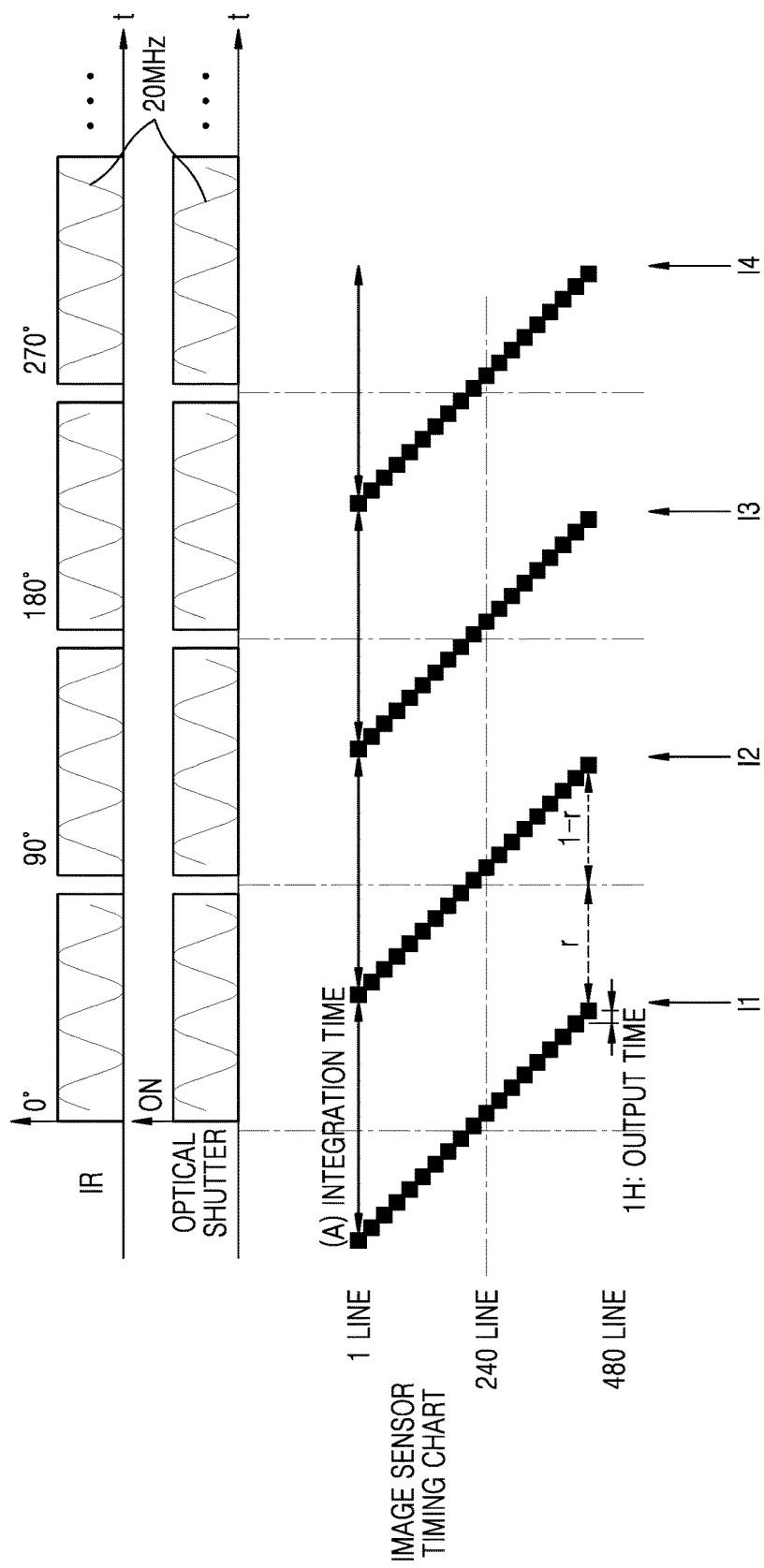
FIG. 2 illustrates an operation of acquiring depth information, according to an exemplary embodiment.
Figure 6:
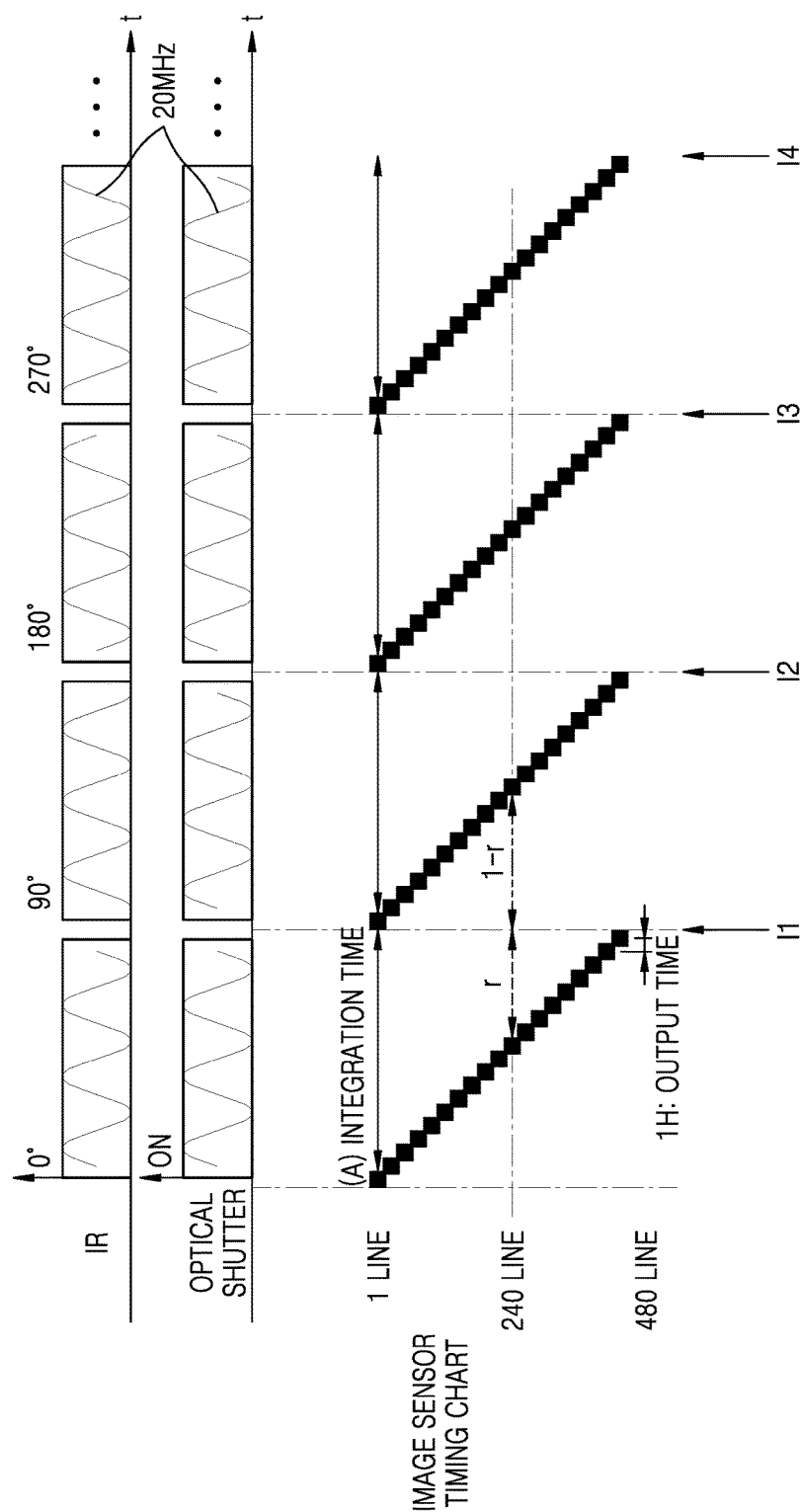
FIG. 6 illustrates an operation of acquiring depth information, according to a comparative example.
Figure 8:
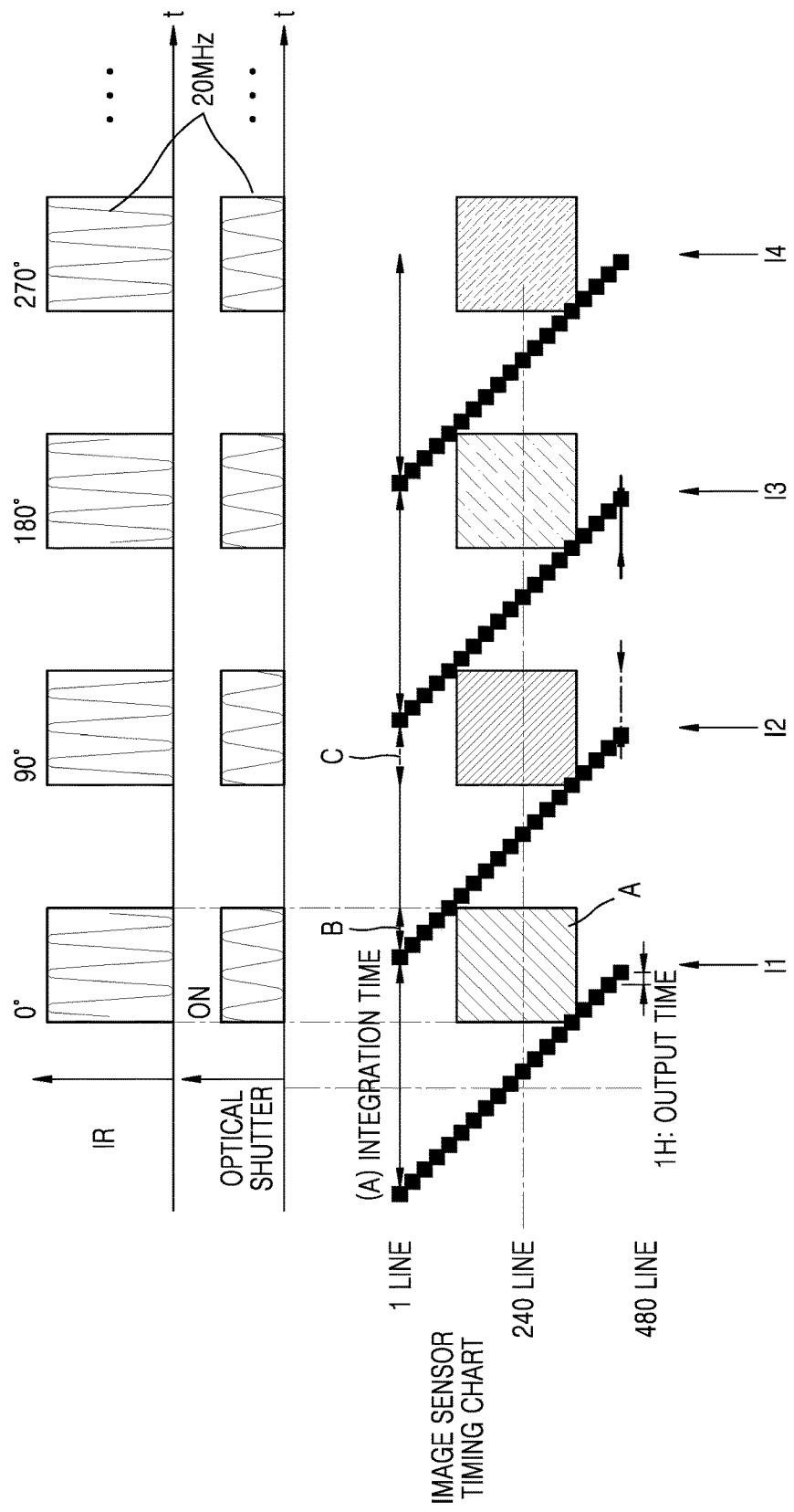
FIG. 8 illustrates an operation of acquiring depth information, according to another aspect of an exemplary embodiment.

FIGS. 2, 6, and 8 illustrate examples in which IR light as the illumination light is output while shifting a phase thereof by 0°, 90°, 180°, and 270° and modulating an amount thereof at about 20 MHz, and the optical shutter 103 is also driven at the same period as that of the optical shutter 103, e.g., about 20 MHz.

For the optical shutter 103, for example, a gallium arsenide (GaAs)-based solid-state modulator element, a thin modulator element using an electro-optic material, or the like may be used. Although FIG. 1 shows that the optical shutter 103 is a transmissive type, a reflective optical shutter may also be used.

The image sensor 105 generates an image signal by detecting reflective light modulated by the optical shutter 103 under control of the controller 106. The image sensor 105 may be any one of a charge-coupled device (CCD) image sensor or a complementary metallic oxide semiconductor (CMOS) image sensor having a 2D array, and a 2D photodiode array. Alternatively, other types of image sensors may be applied to the image sensor 105.

The depth image processor 107 calculates depth information based on an output of the image sensor 105. The depth image processor 107 may be implemented by, for example, an exclusive integrated circuit (IC) or software installed in the depth information acquisition apparatus 100. When the depth image processor 107 is implemented by software, the depth image processor 107 may be stored in a separate portable storage medium.

Hereinafter, an operation of the depth information acquisition apparatus 100 is described.

First, the light source 101 projects illumination light having a certain period and waveform to the subject 200 according to control of the light source driver 102.

For example, illumination light 1 may be generated and projected to the subject 200 for a time T1, illumination light 2 of which a phase has been shifted by 90° relative to illumination light 1 may be generated and projected to the subject 200 for a time T2, illumination light 3 of which a phase has been shifted by 180° relative to illumination light 1 may be generated and projected to the subject 200 for a time T3, and illumination light 4 of which a phase has been shifted by 270° relative to illumination light 1 may be generated and projected to the subject 200 for a time T4. The illumination lights 1, 2, 3, and 4 sequentially projected to the subject 200 may have a waveform, such as a sinusoidal waveform, having a particular period and may have different phases. For example, the illumination lights 1, 2, 3, and 4 may be periodic waves having a same period, waveform, and size, but having different phases.

The illumination light projected to the subject 200 is reflected from the surface of the subject 200 and is then incident to the first lens 108. For example, reflective light 1 is generated when the illumination light 1 is reflected from the surface of the subject 200, reflective light 2 is generated when the illumination light 2 is reflected from the surface of the subject 200, reflective light 3 is generated when the illumination light 3 is reflected from the surface of the subject 200, and reflective light 4 is generated when the illumination light 4 is reflected from the surface of the subject 200.

The first lens 108 focuses the reflective light within the region of the optical shutter 103. The filter 109 may be configured to transmit only light having a certain wavelength, and may be disposed between the first lens 108 and the optical shutter 103 to remove background light and noise light except for the certain wavelength. For example, when the light source 101 emits light having an infrared (IR) wavelength, e.g., near infrared (NIR) wavelength of about 850 nm, the filter 109 may be an NIR band pass filter configured to transmit an NIR wavelength band of about 850 nm therethrough. Therefore, among light incident to the optical shutter 103, light emitted from the light source 101 and reflected from the subject 200 may be dominant.

Although FIG. 1 shows that the filter 109 is disposed between the first lens 108 and the optical shutter 103, the positions of the first lens 108 and the filter 109 may be exchanged. For example, reflective light which has first passed through the filter 109 may be focused on the optical shutter 103 by the first lens 108. Thereafter, the optical shutter 103 modulates the reflective light by using a modulation signal having a certain waveform. A waveform and period of a gain wave in the optical shutter 103 may be the same as the waveform and period of the illumination light. As shown in FIG. 1, the optical shutter 103 may modulate the reflective lights 1, 2, 3, and 4 reflected from the subject 200 and sequentially input for about the times T1, T2, T3, and T4, respectively, and provide the modulated reflective lights 1, 2, 3, and 4 to the image sensor 105.

The light modulated by the optical shutter 103 may be magnification-adjusted and refocused while passing through the second lens 110 and then arrive at the image sensor 105. Therefore, the light reflected from the subject 200 and modulated by the optical shutter 103 may be concentrated within the region of the image sensor 105 by the second lens 110. The image sensor 105 generates an image signal by receiving the modulated light for a certain exposure time, e.g., T1, T2, T3, and T4. For example, the image sensor 105 generates an image signal $I_1$ by receiving the reflective light 1, which has been reflected from the subject 200 and then modulated, for a certain exposure time, e.g., for T1. The image sensor 105 generates an image signal $I_2$ by receiving the reflective light 2, which has been reflected from the subject 200 and then modulated, for a certain exposure time, e.g., for T2. The image sensor 105 generates an image signal $I_3$ by receiving the reflective light 3, which has been reflected from the subject 200 and then modulated, for a certain exposure time, e.g., for T3. The image sensor 105 generates an image signal $I_4$ by receiving the reflective light 4, which has been reflected from the subject 200 and then modulated, for a certain exposure time, e.g., for T4. Herein, T1, T2, T3, and T4 may indicate a same time.

The image signals $I_1$, $I_2$, $I_3$, and $I_4$ may indicate subframe images to be used to generate a one-frame image having depth information. For example, when a period of one frame is Td, an exposure time for the image sensor 105 to obtain each of the image signals $I_1$, $I_2$, $I_3$, and $I_4$ may be about Td/4.

In the depth information acquisition apparatus 100, the image sensor 105 may be controlled to generate an image signal by operating in a rolling shutter scheme. A pixel array region of the image sensor 105 may include N rows, and a phase of the illumination light may be shifted at a time point where exposure of a certain row belonging to an intermediate region of the pixel array region starts.

For example, when the pixel array region of the image sensor 105 includes N rows and includes a first region including a first row of the N rows, a second region including an Nth row of the N rows, and the intermediate region located between the first region and the second region, the phase of the illumination light may be shifted at a time point where exposure of a certain row belonging to the intermediate region of the pixel array region starts. For example, the intermediate region may include an N/2th row, and the phase of the illumination light may be shifted at a time point where exposure of the N/2th row of the pixel array region starts, as shown in FIG. 2.

FIG. 2 illustrates an operation of acquiring depth information, according to an exemplary embodiment, wherein the image sensor 105 having 480 rows, i.e., 480 lines, operates in the rolling shutter scheme, and the phase of the illumination light is shifted at a time point where exposure of the N/2th row of the pixel array region, i.e., a 240$^{th}$ line, starts.

Referring to FIG. 2, the illumination light may be, for example, IR light, and may be modulated using a modulation signal of a sinusoidal waveform and projected, and the phase of the illumination light may be shifted to 0°, 90°, 180°, and 270° at a time point where exposure of an intermediate row of the pixel array region of the image sensor 105, e.g., the 240$^{th}$ line, starts.

Figure 3:
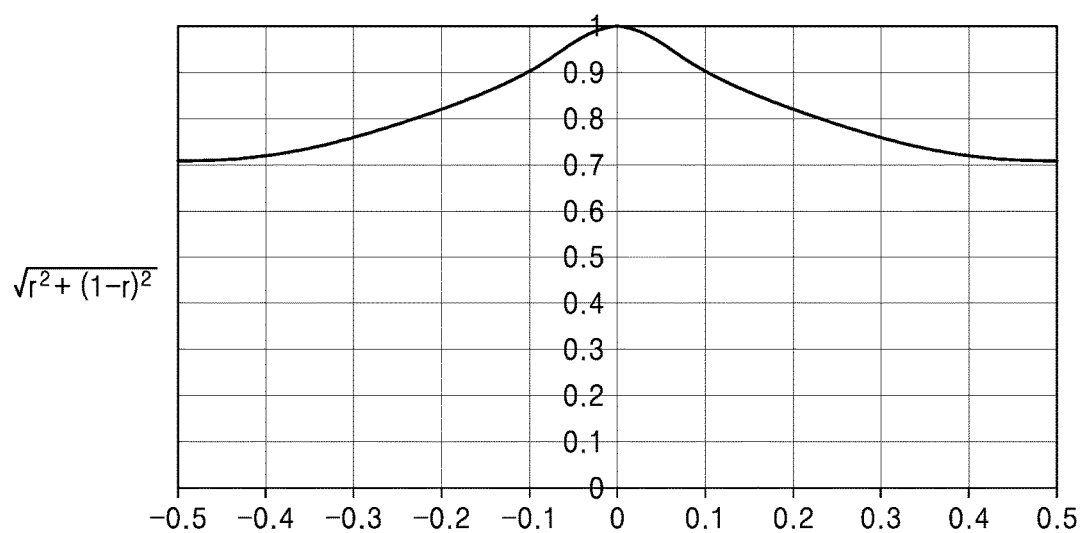
FIG. 3 illustrates a graph showing a change in an amplitude of an image signal integrated during an exposure time of each row, which is obtained in FIG. 2.

When the phase of the illumination light is shifted by 90°, and each row of the pixel array region is exposed during a period r before the phase shift of the illumination light and a period (1−r) after the phase shift of the illumination light, an amplitude of an image signal acquired from each row of the pixel array region of the image sensor may be proportional to $\sqrt{r^2+(1-r)^2}$. Also, as shown in FIG. 3, a value of r is zero in the N/2th row, i.e., the intermediate row, and thus, an amplitude of an image signal integrated for an exposure time, i.e., an integration time, may be maximized, and illumination light having a different phase is not mixed. Except for the N/2th row, i.e., the intermediate row, an amplitude of an image signal integrated for an exposure time in each row may be reduced.

Image signals $i_1$, $i_2$, $i_3$, and $i_4$ respectively acquired with respect to the illumination light of which the phase has been shifted to 0°, 90°, 180°, and 270° may be expressed by Equation 1.

$$i_1 = a\cos(\varphi)+b$$
$$i_2 = a\sin(\varphi)+b$$
$$i_3 = -a\cos(\varphi)+b$$
$$i_4 = -a\sin(\varphi)+b \qquad (1)$$

In Equation 1, a corresponds to the amplitude of the illumination light, b corresponds to an offset of the illumination light, and φ denotes depth information and may be obtained using $$\varphi = \tan^{-1}\left(\frac{-i_2+i_4}{i_1-i_3}\right),$$

wherein a depth may be expressed by Equation 2.

$$depth = \frac{c}{4\pi f}\tan^{-1}\left(\frac{-i_2+i_4}{i_1-i_3}\right) \qquad (2)$$

In addition, since the performance of depth precision is proportional to an amplitude of an image signal, a depth information error $\sigma_{depth}$ may be expressed by Equation 3.

$$\sigma_{depth} \propto \frac{1}{\alpha} \qquad (3)$$

Since the phase of the illumination light changes at a time point where exposure of a certain row located in the intermediate region of the pixel array region of the image sensor 105 starts, each of the image signals $I_1$, $I_2$, $I_3$, and $I_4$ integrated during an exposure time in each row is obtained by summing image signals integrated during the period r before the phase shift of the illumination light and the period (1−r) after the phase shift of the illumination light. For example, the image signal $I_1$ becomes $I_1=(f)i_1+(1-r)i_2$ as shown in Equation 4. When $i_1$ and $i_2$ of Equation 1 are applied, the image signal $I_1$ may be calculated as shown in Equation 4.

$$\begin{aligned}I_1 &= ri_1 + (1-r)i_2 \\ &= r(\alpha\cos(\varphi)+b) + (1-r)(\alpha\sin(\varphi)+b) \\ &= a\sqrt{r^2+(1-r)^2}\cos(\varphi+\alpha)+b\end{aligned} \qquad (4)$$

Figure 4:
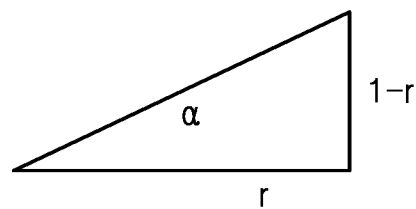
FIG. 4 illustrates an angle α of a hypotenuse when a relationship between a period r and a period (1−r) is expressed using a base and a height of a right-angled triangle.

In Equation 4, α corresponds to an angle of a hypotenuse when a relationship between r and (1−r) is expressed using a base and a height of a right-angled triangle as shown in FIG. 4.

As shown in Equation 4, an amplitude of an image signal integrated during an exposure time in each row is proportional $a\sqrt{r^2+(1-r)^2}$, and thus, $\sqrt{r^2+(1-r)^2}=1$ in an intermediate row in which r=0, i.e., the N/2th row (240$^{th}$ row in a case of 480 lines), and the image signal $I_1$ may have a maximum amplitude a, which is the same as an amplitude of the image signal $i_1$.

In addition, since r=0.5 in the first row and the Nth row, α becomes 45°, and thus, the image signal $I_1$ may be calculated as expressed in Equation 5 and has a minimum amplitude.

$$\text{if } r = 0.5, \qquad (5)$$
$$I_1 = \frac{\alpha}{\sqrt{2}}\cos(\varphi-45°)+b$$

Figure 5:
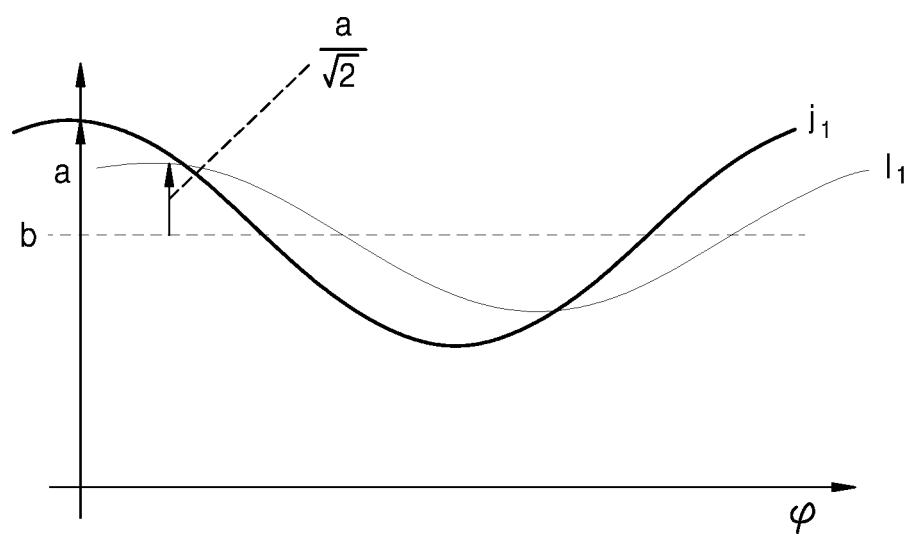
FIG. 5 illustrates a graph showing a difference in amplitudes and phases of image signals $i_1$ and $I_1$ when $I_1$ has a minimum amplitude as r=0.5.

A graph of FIG. 5 shows a difference in amplitudes and phases of the image signals $i_1$ and $I_1$ when $I_1$ has the minimum amplitude as r=0.5.

When it is considered that a part of interest when an image is acquired using a 3D image acquisition apparatus is usually a center part of the image, it is necessary to increase precision of depth information extraction in an intermediate region of a pixel array region. According to the depth information acquisition apparatus 100, since an amplitude of an image signal may be maximized in an intermediate region of a pixel array region, a precision error of depth information may be reduced, and thus, the performance of depth precision when the depth information is extracted may be increased.

Figure 7:
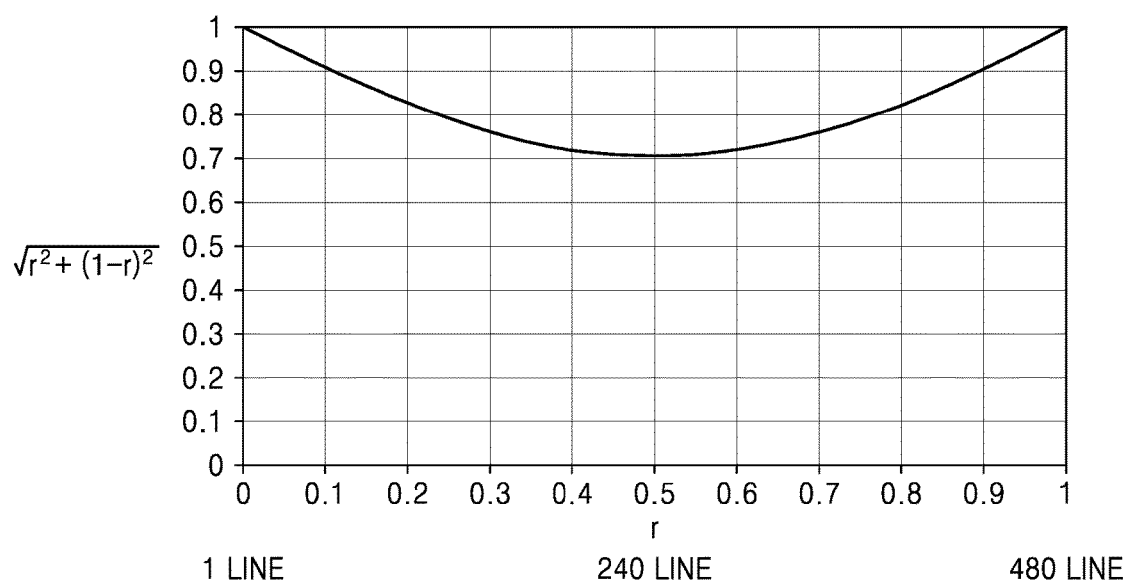
FIG. 7 illustrates a graph showing a change in an amplitude of an image signal integrated during an exposure time of each row, which is obtained in FIG. 6.

FIG. 6 illustrates an operation of acquiring depth information, according to a comparative example, wherein the image sensor 105 having 480 rows, i.e., 480 lines, operates in the rolling shutter scheme, and the phase of the illumination light is shifted at a time point where exposure of the first row of the pixel array region, i.e., a first line, starts. FIG. 7 illustrates a graph showing a change in an amplitude of an image signal integrated during an exposure time of each row, which is obtained in FIG. 6.

As shown in FIG. 6, when the phase of the illumination light is shifted in the first row, r=0 in the first row, r=1 in the Nth row, and r=0.5 in the intermediate row of the pixel array region, e.g., 240$^{th}$ line, and thus, if Equation 4 is applied, an amplitude of an image signal integrated during an exposure time in the intermediate row of the pixel array region varies as shown in FIG. 7. That is, according to the depth information acquisition method of the comparative example, the amplitude of the image signal is minimized in the intermediate region of the pixel array region, and thus, the performance of depth precision when depth information is extracted is worse than the exemplary embodiment described above in which the phase of the illumination light is shifted to an exposure time of a certain row located in the intermediate region of the pixel array region.

Although it has been described that the illumination light is continuously projected, the depth information acquisition apparatus 100 may use illumination light emitted in certain time units. That is, the illumination light may be burst-driven and emitted in certain time units. In this case, a time point where emission of the illumination light starts after shifting the phase of the illumination light may be later than the time point where exposure of the N/2th row of the pixel array region starts. As described above, when the illumination light is burst-driven, a duration in which an image signal is acquired without mixing illumination light having a different phase may exist. That is, when a phase of continuously emitted illumination light is shifted at a time point where exposure of the N/2th row starts, an image signal may be acquired without mixing illumination light having a different phase only in the N/2th row. However, when the illumination light is burst-driven and emitted in certain time units, a duration in which an image signal is acquired without mixing illumination light having a different phase exists, and thus, a pixel region range in which an amplitude of the image signal is close to a maximum value may be widened, thereby increasing the performance of depth precision when depth information is extracted.

Figure 9:
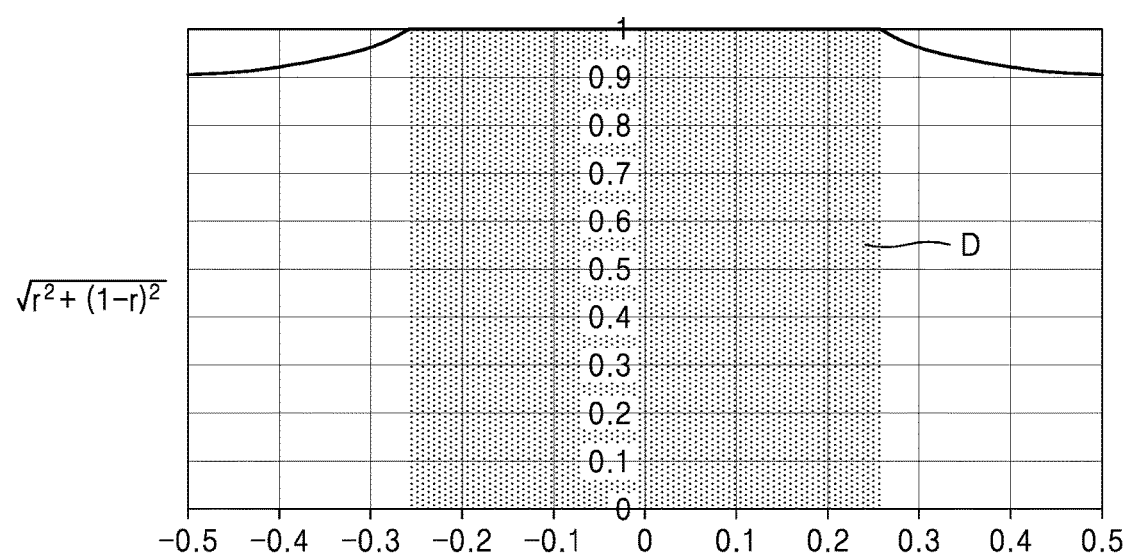
FIG. 9 illustrates a graph showing a change in an amplitude of an image signal integrated during an exposure time of each row, which is obtained in FIG. 8.

FIG. 8 illustrates an operation of acquiring depth information, according to another aspect of an exemplary embodiment, wherein the image sensor 105 having 480 rows, i.e., 480 lines, operates in the rolling shutter scheme, and illumination light of which a phase is shifted is burst-driven and emitted in certain time units. FIG. 9 illustrates a graph showing a change in an amplitude of an image signal integrated during an exposure time of each row, which is obtained in FIG. 8.

Referring to FIG. 8, the illumination light may be, for example, IR light, and may be modulated using a modulation signal of a sinusoidal waveform and projected and may be burst-driven and emitted in certain time units, and the phase of the illumination light may be shifted to 0°, 90°, 180°, and 270° at a time point later than a time point where exposure of an intermediate row of the pixel array region of the image sensor 105, e.g., the $240^{th}$ line, starts.

In this case, the time point where emission of the illumination light starts after shifting the phase of the illumination light is later than the time point where exposure of an N/2th row of the pixel array region, e.g., the $240^{th}$ line of 480 lines, starts. Illumination light having a different phase is not mixed during the exposure time in the intermediate region including the N/2th row of the pixel array region (region A), and Illumination light having a different phase is mixed during the exposure time the first region including the first row and the second region including the Nth row (B+C).

Therefore, as shown in FIG. 9, r=0 in the N/2th row, i.e., the intermediate row, and thus, an amplitude of an image signal integrated during an exposure time, i.e., an integration time, is maximized, and a region D in which illumination light having a different phase is not mixed since a value of r is close to zero exists. The region D of FIG. 9 is a region of operating as a global shutter, and since an intermediate region of which precision of depth information extraction is high may be widened, a precision error of depth information may be reduced, and the performance of depth precision when depth information is extracted may be increased.

As described above, when a depth information acquisition apparatus and method are applied to a 3D image acquisition apparatus for sensing image information, a 3D image with a high depth precision may be realized.

According to an apparatus and a method for acquiring depth information, according to one or more exemplary embodiments, an image signal is generated by driving an image sensor in a rolling shitter scheme while shifting a phase of illumination light from a time point where exposure of a certain row belonging to an intermediate region of a pixel array region, and thus, the performance of depth precision when depth information is extracted may be increased. Therefore, even when the image sensor is driven in the rolling shitter scheme, similar effects to an image sensor driven in a global shutter scheme may be obtained, and thus, precision of a depth image may be improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A depth information acquisition method comprising:
   emitting illumination light, of which an amount has been modulated by a modulation signal, towards a subject;
   receiving, by an image sensor, reflective light reflected from the subject, the image sensor having a pixel array region including a plurality of rows, the plurality of rows including a first region including a first row of the plurality of rows, a second region including a last row of the plurality of rows, and an intermediate region including a center row of the plurality of rows;
   for a plurality of frames:
      sequentially acquiring an image signal from each of the plurality of rows by staggering a start exposure time for each of the plurality of rows; and
      shifting a phase of the illumination light at a start exposure time of a row belonging to the intermediate region of the pixel array region; and
      calculating depth information of the subject from the image signal acquired during the plurality of frames,
   wherein an exposure time during which the center row is exposed to the illumination light before the phase of the illumination light is shifted, is set to zero so that the center row is exposed to the illumination light after the phase of the illumination light is shifted, and an amplitude of the image signal is maximized at the center row and gradually decreases with distance from the center row.

2. The depth information acquisition method of claim 1, wherein the phase of the illumination light is shifted at a start exposure time of the center row of the pixel array region.

3. The depth information acquisition method of claim 1, wherein the shifting the phase of the illumination light comprises shifting the phase of the illumination light by 90°, such that each row of the pixel array region is exposed during a first period r before the phase shift of the illumination light and a second period (1−r) after the phase shift of the illumination light, and the amplitude of the image signal acquired from each row of the pixel array region of the image sensor is proportional to $\sqrt{r^2+(1-r)^2}$.

4. A depth information acquisition method comprising:
emitting illumination light, of which an amount has been modulated by a modulation signal, towards a subject;
receiving, by an image sensor, reflective light reflected from the subject, the image sensor having a pixel array region including a plurality of rows, the plurality of rows including a first region including a first row of the plurality of rows, a second region including a last row of the plurality of rows, and an intermediate region including a center row of the plurality of rows;
for a plurality of frames:
sequentially acquiring an image signal from each of the plurality of rows b staggering a start exposure time for each of the plurality of rows;
shifting a phase of the illumination light at a start exposure time of a row belonging to the intermediate region of the pixel array region; and
calculating depth information of the subject from the image signal acquired during the plurality of frames,
wherein an exposure time during which the row belonging to the intermediate region is exposed to the illumination light before the phase of the illumination light is shifted, is set to zero so that the row belonging to the intermediate region is exposed to the illumination light after the phase of the illumination light is shifted,
wherein the illumination light is burst-driven and emitted in predetermined time units, and further comprising shifting the phase of the illumination light and starting an emission of the illumination light after a start exposure time of the center row of the pixel array region.

5. The depth information acquisition method of claim 4, wherein the image signal corresponds to only a single phase of the illumination light.

6. The depth information acquisition method of claim 1, wherein the shifting the phase of the illumination light comprises shifting the phase of the illumination light by 90°, and further comprising calculating the depth information from the image signal acquired from four frames.

7. A depth information acquisition apparatus comprising:
a light source configured to emit illumination light, of which an amount has been modulated by a modulation signal, towards a subject;
an image sensor configured to receive reflective light reflected from the subject, the image sensor having a pixel array region including a plurality of rows, the plurality of rows including a first region including a first row of the plurality of rows, a second region including a last row of the plurality of rows, and an intermediate region including a center row of the plurality of rows; and
a depth image processor configured to, for a plurality of frames, sequentially acquire an image signal from each of the plurality of rows by staggering a start exposure time for each of the plurality of rows, and to calculate a distance to the subject by using the image signal, and
a controller configured to shift a phase of the illumination light at a start exposure time of the center row, and set an exposure time during which the center row is exposed to the illumination light before the phase of the illumination light is shifted, to zero so that the center row is exposed to the illumination light after the phase of the illumination light is shifted, and an amplitude of the image signal is maximized at the center row and gradually decreases with distance from the center row.

8. The depth information acquisition apparatus of claim 7, wherein the image sensor is further configured to operate in a rolling shutter scheme.

9. The depth information acquisition apparatus of claim 7, further comprising a light source driver configured to drive the light source by using the modulation signal and shift the phase of the modulation signal by synchronizing with a frame rate of the image sensor.

10. The depth information acquisition apparatus of claim 7, wherein the image sensor is any one of a charge-coupled device (CCD) image sensor, a complementary metallic oxide semiconductor (CMOS) image sensor, and a photodiode array.

11. A three-dimensional (3D) image acquisition apparatus comprising the depth information acquisition apparatus of claim 7 and an image acquisition apparatus for sensing image information.

12. The 3D image acquisition apparatus of claim 11, wherein the image sensor of the depth information acquisition apparatus is further configured to operate in a rolling shutter scheme.

13. The 3D image acquisition apparatus of claim 11, wherein the depth information acquisition apparatus further comprises a light source driver configured to drive the light source by using the modulation signal and shift the phase of the modulation signal by synchronizing with a frame rate of the image sensor.

14. The 3D image acquisition apparatus of claim 11, wherein the image sensor of the depth information acquisition apparatus is any one of a charge-coupled device (CCD) image sensor, a complementary metallic oxide semiconductor (CMOS) image sensor, and a photodiode array.

* * * * *